(12) United States Patent
Garriga Jimenez et al.

(10) Patent No.: US 10,293,966 B2
(45) Date of Patent: May 21, 2019

(54) DEVICE FOR TRANSPORTING IN A PACKAGING LINE FLEXIBLE PACKAGING HELD SUSPENDED

(71) Applicant: PFM IBERICA PACKAGING MACHINERY, S.A., Esplugues de Llobregat (ES)

(72) Inventors: Jose Garriga Jimenez, Les Franqueses del Valles (ES); Andrea Fioravanti, Schio (IT); Cristobal Jorge Alesanco, Barcelona (ES)

(73) Assignee: PFM IBERICA PACKAGING MACHINERY, S.A., Esplugues de Llobregat (Barcelona) (ES)

( * ) Notice: Subject to any disclaimer, the term of this patent is extended or adjusted under 35 U.S.C. 154(b) by 627 days.

(21) Appl. No.: 14/890,686

(22) PCT Filed: May 14, 2014

(86) PCT No.: PCT/ES2014/070397
§ 371 (c)(1),
(2) Date: Nov. 12, 2015

(87) PCT Pub. No.: WO2014/207278
PCT Pub. Date: Dec. 31, 2014

(65) Prior Publication Data
US 2016/0122063 A1 May 5, 2016

(30) Foreign Application Priority Data

May 15, 2013 (ES) .................................. 201330692

(51) Int. Cl.
*B65B 65/00* (2006.01)
*B65B 43/04* (2006.01)
(Continued)

(52) U.S. Cl.
CPC ............ *B65B 65/006* (2013.01); *B65B 43/04* (2013.01); *B65B 43/123* (2013.01); *B65B 43/32* (2013.01);
(Continued)

(58) Field of Classification Search
CPC .................................................... B65B 43/123
(Continued)

(56) References Cited

U.S. PATENT DOCUMENTS 3,762,253 A 10/1973 Loomis, Jr. et al.
4,027,450 A 6/1977 Chiu et al.
(Continued)

FOREIGN PATENT DOCUMENTS

DE 199 15 271 A1 10/2000
EP 0 999 130 A2 5/2000
(Continued)

OTHER PUBLICATIONS

Spanish Search Report of Spanish Patent Application No. P 201330692.
(Continued)

*Primary Examiner* — Lori Baker
(74) *Attorney, Agent, or Firm* — Sughrue Mion, PLLC (57) ABSTRACT

Device for transporting containers in a packaging line, having a number of guides that determine a closed route including a horizontal stretch and upon which a first and second carrying element slide. The guides are directed on a vertical plane and each carrying element has two arms, each one of which extends to one side of the vertical plane, each arm (5a; 6a) of a carrying element is designed to work alongside the arm arranged on a same side of the vertical plane of the other carrying element adjacent to them, to jointly secure and transport a corresponding container, so as to be secured and transported along the length of the horizontal stretch of the route and at least two containers (Continued)

between each two adjacent carrying elements at the same time, one at each side of the vertical plane.

17 Claims, 10 Drawing Sheets

(51) Int. Cl.
- *B65B 43/12* (2006.01)
- *B65B 43/32* (2006.01)
- *B65B 43/46* (2006.01)
- *B65B 43/54* (2006.01)
- *B65B 59/00* (2006.01)
- *B65B 59/02* (2006.01)
- *B65G 47/86* (2006.01)
- *B65G 17/00* (2006.01)
- *B65G 54/02* (2006.01)
- *B65B 43/50* (2006.01)

(52) U.S. Cl.
CPC ............ *B65B 43/465* (2013.01); *B65B 43/50* (2013.01); *B65B 43/54* (2013.01); *B65B 59/00* (2013.01); *B65B 59/02* (2013.01); *B65G 17/005* (2013.01); *B65G 47/842* (2013.01); *B65G 54/02* (2013.01)

(58) Field of Classification Search
USPC ........................................................ 53/284.7
See application file for complete search history.

(56) References Cited

U.S. PATENT DOCUMENTS

| | | |
|---|---|---|
| 2003/0230941 A1 | 12/2003 | Jacobs |
| 2010/0269458 A1 | 10/2010 | Veix |
| 2013/0035784 A1 | 2/2013 | Wernersbach et al. |

FOREIGN PATENT DOCUMENTS

| | | |
|---|---|---|
| EP | 0 999 137 A2 | 5/2000 |
| EP | 2 522 584 A1 | 11/2012 |
| ES | 2 161 11 A1 | 11/2001 |
| ES | 2 161 111 A1 | 11/2001 |
| JP | 60-123324 A | 7/1985 |
| WO | 03/047977 A2 | 6/2003 |
| WO | 2004/002831 A1 | 1/2004 |
| WO | 2013/035061 A2 | 3/2013 |

OTHER PUBLICATIONS

International Search Report of PCT/ES2014/070397 dated Sep. 29, 2014 [PCT/ISA/210].

JacobsAutomation, "PackTrak Flexible Pouching Application with Linear Drive or Servo Motor", <online Video> https://www.youtube.com/watch?v=_7qFVQflUo0, Mar. 10, 2010.

Aaron Equipment Company, "Used Roberts Packaging Model C-1000 Horizontal Pouch Filling Machine-Stock# 84130", <online Video> https://www.youtube.com/watch?v=GCheCu0YeBk, Apr. 8, 2010.

Third Party Observation dated Sep. 15, 2015, issued by the Patent Cooperation Treaty in PCT application No. PCT/ES2014/070397.

English Translation of Third Party Observation of PCT Application No. PCT/ES2014/070397 issued Sep. 15, 2015.

DEVICE FOR TRANSPORTING IN A PACKAGING LINE FLEXIBLE PACKAGING HELD SUSPENDED

CROSS REFERENCE TO RELATED APPLICATIONS

This application is a National Stage of International Application No. PCT/ES2014/070397, filed May 14, 2014, claiming priority based on Spanish Patent Application No. P 201330692, filed May 15, 2013, the contents of all of which are incorporated herein by reference in their entirety.

TECHNICAL FIELD OF THE INVENTION

The present invention refers to a forwards moving intermittent transportation device for flexible containers held suspended in a packaging line, comprising the use of pairs of movable arms on a single movement plane, between which a container is held in opposite areas. The invention also refers to a machine into which said device is built.

BACKGROUND OF THE INVENTION

Within the field of automatic horizontal packaging machines, the use of carrousels, chain conveyors and such like are known about. They are used to transport the tools designed to secure containers during the manufacturing process.

In general, a simultaneous, forwards movement is transmitted to these tools, which may be either continuous or intermittent. The packaging chain is therefore often referred to as a container train, given that all the containers are moved in unison at the same forwards moving rhythm, set by the rotation of the carrousel or the movement of the chain or continuous conveyor.

Traditionally, securing tools describe a closed, horizontal trajectory comprising two straight sections, one of which is operational and along the length of which the containers are secured and transported for handling, filling and subsequent closure in respective work stations and another return section, along the length of which the tools travel empty.

This kind of machine has certain limitations, which have been resolved in various ways.

Firstly, there is the limitation that unwanted inertia occurs, especially when the product to be packaged is a liquid. This inertia occurs each time the containers are held in a work station and when the transport movement towards a subsequent station starts up.

Inertia causes the product inside the containers to move and has a negative impact on the productivity of the machines, given that it prevents high transportation velocities involving more abrupt accelerations and decelerations from being applied to the containers, thus causing the product to come out of the upper portion of the containers.

In order to compensate for the limitation of not being able to make quick transitions between stations, productivity often tends to be increased by doubling the number of work stations, so that the operations to be carried out on the containers may go ahead in two consecutive containers travelling on the container train at the same time. Those machines that employ this solution, often referred to as duplex machines, deliver two finished containers in each forwards moving cycle. Nevertheless, they present the limitation of being larger, thereby impacting cost.

Patent document EP 2522584 describes an alternative solution, employing a carrousel comprising a guide, upon which a number of carts carrying the tools for securing the containers slide. In this machine, each cart carries a tool for securing two containers, whilst they are meanwhile transported in parallel along the external side of the guide. This makes it possible to double the productivity of the machine, without it being necessary to increase the length of the straight operational section of the carrousel, maintaining the forwards moving velocity of the machine, despite the fact that the required length of the tools for securing more than one container would generate other kinds of problems, owing to the weight of the containers being suspended when they are full or the reduction in available space for the filling and soldering mechanisms to be able to operate on the two containers at the same time as they are so close to one another. The machine also has a built in system that makes it possible to reduce the number of tools, without affecting the number of containers that the machine is capable of transporting at the same time along the straight operational section. This system is designed to uncouple the tools from the transportation system, which pulls them along the length of the straight operational section, in order to be transported by different means and at greater velocity along the length of at least the straight return section.

More recently, deriving benefit from innovative transportation systems that make it possible to control and operate mobile elements that are mounted to and may be moved along the length of a track individually, the company KHS USA Inc. shared knowledge of a machine model that serves as a substitute for the traditional mechanical drive carrousel for transporting the carts carrying the securing tools with a set of motor elements that may be operated independently, in order to move along the length of a track, which, just like the carrousel, determines a closed, horizontal route for said motor elements, the movement of which may be controlled individually, by means of employing a magnetic field. In this machine, each motor element carries a tool that works alongside the tool of an adjacent motor element in order to secure a corresponding container between the two, the same being arranged on the external side of the track and being transported along the length of a straight section of the same. Advantageously, not only may the motor elements move along the length of a return section of the track at greater velocity than along the length of the operational section, as in the proposal set out in EP 2522584, it is also no longer mechanically necessary to move all the containers along the operational section in the same way and in unison. In other words, it is no longer necessarily a container train but rather, each container may be moved and/or held independently from the others.

Both simple and dual versions of the machine described above, which applies this new transportation system, are known about, i.e., versions capable of transporting 1 or 2 bags lined up in each machine cycle, respectively.

The use of this kind of transportation system with movable platforms that may be easily positioned, may be put in different positions quickly and accurately by means of electromagnetic energy and may be configured easily. However, although they are suitable for transporting bags, the fact that they are new makes them very expensive.

Therefore, in order to save on costs, the machine model described above does not employ the magnetic field effect to propel the motor elements along the straight return section, thus saving on components and electromagnetic field generation control systems, which would need to build the track along the length of said straight return section, in order to magnetically propel the motor elements.

An object of the present invention is an alternative device to those known about, which makes it possible to increase the productivity of a horizontal packaging machine for flexible containers, thus avoiding the limitations presented by known devices.

According to another object of the invention, in addition to making it possible to increase the machine's productivity, thus avoiding the limitations of the solution of suspending two containers using the same tool, as described in patent document EP 2522584, it is also desirable for the device to be capable of increasing the transportation rhythm, i.e. of increasing the number of cycles per minute.

Explanation of the Invention

The device object of the present invention comprises a number of guide means, for example a track, which determine a closed route comprising a horizontal stretch and upon which at least a first and second carrying element slide.

The device is characterized in that the guide means are directed on a vertical plane (Y) and in that each carrying element has two arms, each one of which extends to one side of said vertical plane, being designed so that each arm of a carrying element may work alongside the arm arranged at a same side of the vertical plane of the other carrying element adjacent to them, in order to jointly secure and transport at least one corresponding container, as a result, it being possible for them to be secured and transported along the length of the horizontal stretch of said route and at least two containers at the same time between every two adjacent carrying elements, one at each side of the vertical plane.

In one embodiment, the arms have a number of securing means capable of holding at least one container in a respective anchoring area linked thereto, said securing means being located on the arms, in such a way that the containers being secured and transported to each side of the vertical plane (Y) are equidistant from the same.

In one embodiment, the device comprises a number of pairs of carrying elements, which may be operated individually in order to be moved along the length of the track, as a result of a magnetic field effect generated in the sphere of influence of each carrying element.

The device preferably comprises a number of control means capable of governing the movement of said carrying elements individually or together, according to a pre-established velocity and acceleration model.

In an alternative embodiment, the carrying elements are in pairs, each pair comprising a first and second carrying element and the control means comprise programmable means capable of governing the intermittent movement of said first and second carrying elements, in order to simultaneously move them between every two consecutive stops in a same forwards moving direction on the horizontal stretch, applying a velocity v2 to the second carrying element, which is furthest forward in the forwards direction and a velocity v1 to the first carrying element, which is the furthest back in the forwards direction, thus fulfilling the mathematical relation V1>v2 and subsequently, without stopping the movement of the carrying elements, applying a velocity v2 to the second carrying element and a velocity v1 to the first carrying element, thus fulfilling the mathematical relation V1<v2.

In an alternative embodiment, the device comprises a first and second continuous conveyor system, which may be operated individually or together, a first and second series of carrying elements, the carrying elements of the first series being linked to the first continuous conveyor and the carrying elements of the second series to the second continuous conveyor and the carrying elements of the first series being placed amongst the carrying elements of the second series, the securing means of the arms being opposite two adjacent carrying elements, intended to secure a same container.

In an alternative embodiment the device comprises a number of control means capable of governing the operation of said continuous conveyor systems individually or together, according to a pre-established velocity and acceleration model.

The control means are preferably capable of governing the intermittent operation of said first and second continuous conveyors, in order to simultaneously move them between every two consecutive stops in a same forwards moving direction, applying a velocity v2 to one of them and a velocity v1 to the other, thus fulfilling the mathematical relation V1>v2 and subsequently without stopping the movement of the carrying elements applying a velocity v2 to the second carrying element and a velocity v1 to the first carrying element, thus fulfilling the mathematical relation V1<v2.

The high cost of using transportation systems of the variety that make it possible to move mobile elements individually along the length of a number of guide means or groups of mobile elements individually or together has dissuaded the expert from applying these systems in a device within the invention field. However, in the claimed embodiment of the device for transporting containers, this cost increase is compensated by the high productivity resulting from the use thereof, given that it not only makes it possible to reduce the transportation time for transporting the containers between stops but also doubles the transportation capacity of each forwards moving cycle, thus avoiding the limitations presented by the solutions with the same aim known about to date.

Indeed, the total weight borne by each carrying element is advantageously balanced since each container is at one side of the vertical plane upon which the carrying element moves, thus reducing the mechanical requirements to which the carrying elements are subjected to in being supported on the track as much as possible, for example the moment that the weight of a tool and one or more containers located at just one side of this carrying element represents on each motor element.

In one embodiment, the control unit comprises programmable means capable of governing the movement of said at least first and second carrying elements, in order to simultaneously move them in a same forwards direction on the horizontal stretch, applying a velocity v2 to the second carrying element and a velocity v1 to the first carrying element, thus fulfilling the mathematical relation, V1<v2 and subsequently, without stopping the movement of the carrying elements applying a velocity v2 to the second carrying element and a velocity v1 to the first carrying element, thus fulfilling the mathematical relation V1<v2.

It must be noted that the high cost of using transportation systems of the variety that make it possible to move mobile elements independently along the length of a number of guiding means has dissuaded the expert from applying these systems in a device within the invention field. Nonetheless, in the claimed embodiment of the container transportation device, this cost increase is compensated by the high productivity attained with the use thereof, given that it not only reduces the time needed to transport the containers between stops but also doubles the transportation capacity of each forwards moving cycle, thus avoiding the limitations of the solutions with the same goal known about to date.

Indeed, the total weight borne by each carrying element advantageously becomes equivalent to that of one single container and is furthermore balanced, even more so when working together to secure two containers at the same time, since each container is at one side of the vertical plane, upon which the carrying element is moved, thus reducing the mechanical requirements to which the carrying elements are subjected to in being supported on the track as far as possible, for example the moment that the weight of a tool and one or more containers located at just one side of this carrying element represents on each motor element.

The arms therefore preferably have a number of securing means, capable of securing at least one container in a respective related anchoring area, said securing means being located on the arms, in such a way that the containers secured and transported to each side of the vertical plane (Y) are equidistant relative to the same.

In an alternative embodiment, the arms of each carrying element are linked to the guide means and are able to rotate around a perpendicular axle (X) towards the vertical plane (Y), each carrying element having a rotation mechanism, which depending on the current position of the carrying element at that moment on the guide means, has its arms in a pre-determined angular position, it being possible to move them closer to or further away from the arms of an adjacent carrying element, with the aim of moving the walls of the container being held secured, thus giving rise to the upper opening thereof.

In an alternative embodiment, the rotation mechanism of each carrying element comprises a lever, the current inclination of which at that moment is transmitted to the arms in order to jointly rotate around the perpendicular axle (x), the lever having a cam follower that slides along a cam channel formed in or joined to the guide means.

The invention intends the guide means to comprise a first and second track, which are parallel to one another, between which the carrying elements are fitted, being able to slide, each one of which has two wheels mounted to it, which rotate around the perpendicular axle (X), each one fitting into a corresponding track, the bottom of each track having a groove, at least one of which serves as a cam channel that controls the rotation of the lever pertaining to the rotation mechanism of the carrying element.

According to a variation, the groove of the first track determines the cam channel for the cam followers of the first series of carrying elements, whilst the groove of the second track determines the cam channel for the cam followers of the second series of carrying elements.

In accordance with another aspect of the invention, a horizontal packaging machine comprising a device for transporting containers according to the invention is known about, the guide means of which comprise an upper operational section with a first horizontal stretch and a lower return section, with a second horizontal stretch overlapping the first horizontal stretch, in addition to a succession of work stations that comprise at least a filling station and an upper closing station for the containers transported between every two arms of the device, designed to handle and operate on two secured containers opposite to one another at the same time, one at each side of the guide means, by means of corresponding carrying elements, whilst the same are on the horizontal stretch of the upper operational section of said guide means.

In an alternative embodiment, the machine comprises a production module for forming flexible containers from a continuous sheet of thermo-welded material, folded over itself along the length of longitudinal fold lines, with a final cutting station or station for separating the containers obtained and a module for transferring containers from the container production module to the device for transporting containers, comprising, at each side of the device for transporting containers, forwards moving continuous interment conveyers, which extend from the cutting station of the production module to the start of the upper operational section of the guide means pertaining to the device for transporting containers, the continuous conveyers having means for transporting the containers made, which would then be presented and transferred to the arms, pertaining to the transportation elements, on the corresponding side of the device for transporting containers to be transferred to the same.

In an embodiment of interest, the work stations are suspended above the transportation device.

According to a variation, the work stations are mounted to two longitudinal guides upon which they can slide, located above the transportation device.

DETAILED DESCRIPTION OF THE INVENTION

Figure 1:
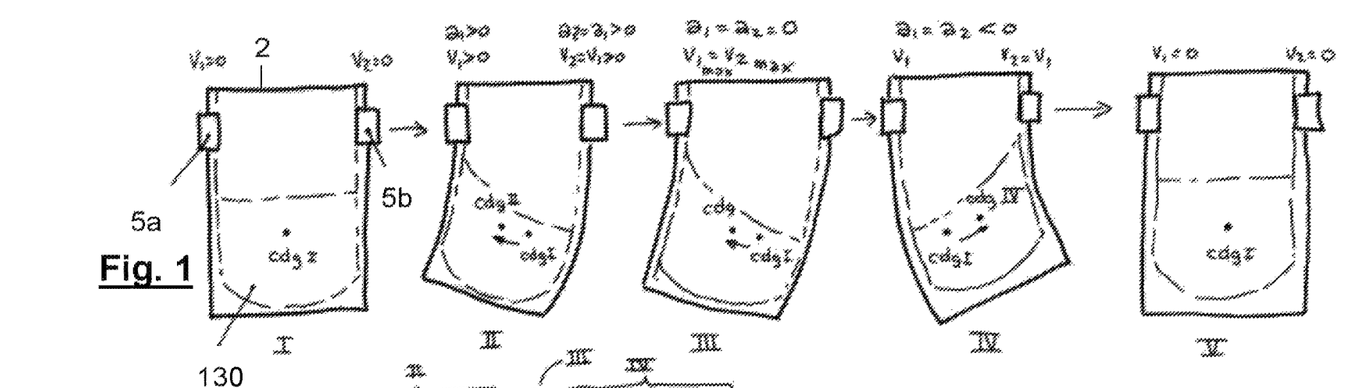
FIGS. 1 to 3 are respective representations of a sequence in the transportation of a container between two consecutive stops secured between a tractor arm and a push arm. The graph illustrates the velocity and acceleration model applied to both the tractor and push arms and there is a schematic representation of the general shape adopted by the container as it is transported, all according to a traditional transportation method.

FIG. 1 illustrates a sequence in the transportation of a flexible container 2 held suspended between a tractor arm 5b and a push arm 5a between two stop locations, coinciding for example with work stations of a packaging module or packaging machine. During the transportation manoeuvre, represented in FIG. 2, the tractor 5b and push arms 5a are jointly driven according to the same velocity and acceleration model. At the top of FIG. 2, the evolution of the velocity (v) is represented and below, the evolution of the acceleration (a) according to the same time scale (t).

Figure 2:
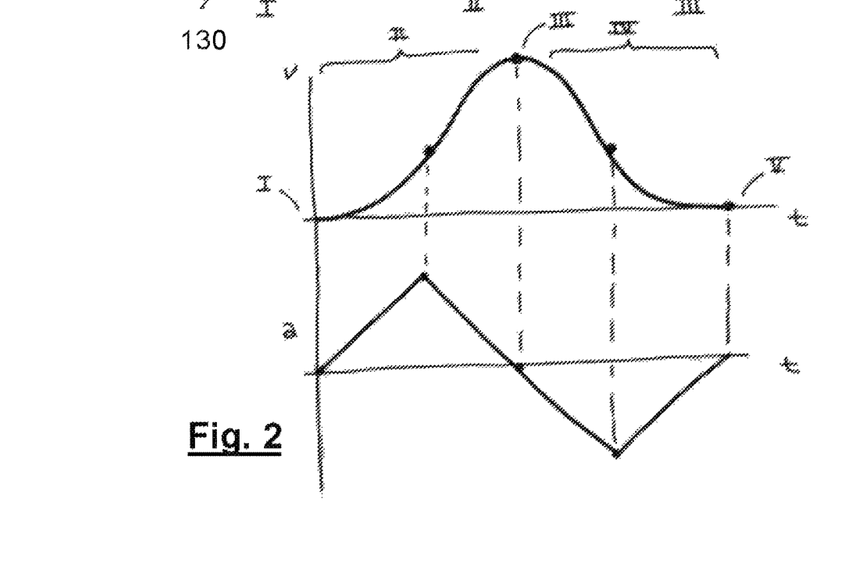

During transportation, the contents 130 of the container 2 is subject to the forces of inertia generated by the start-up and stop maneuvers in the movement of said tractor and push arms, 5b and 5a respectively.

Figure 3:
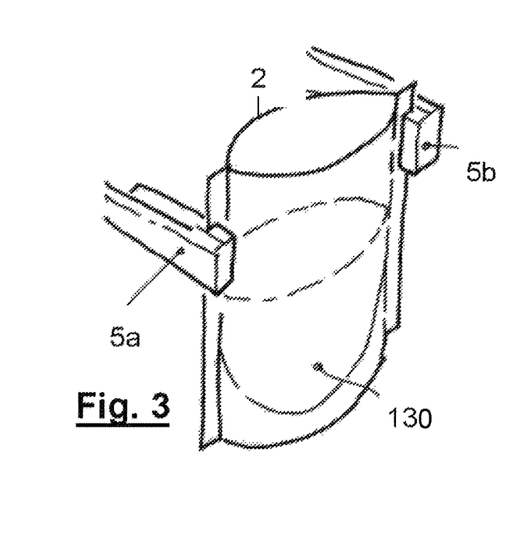

Indeed, starting from the static location shown in the first window, in which the centre of gravity, indicated by cdg I, is arranged in the centre of the container 2, the container 2 is deformed during transportation, as a result of the force exerted by the movement of its contents 130 on the flexible walls of the container 2, even when the distance separating the tractor 5b and push 5a arms is kept constant, as shown in FIG. 3. The sequence shows this deformation of the container during the transportation manoeuvre and the movement of its centre of gravity, which in a first acceleration phase, moves backwards, in the opposite direction to that in which the container is moving and in a second braking stage, it moves forwards. As a direct result, the content 130 of the container 2 moves in a succession of waves and may spill out. This limits the speed of transporting the container 2 between two consecutive work stations considerably.

Figure 4:
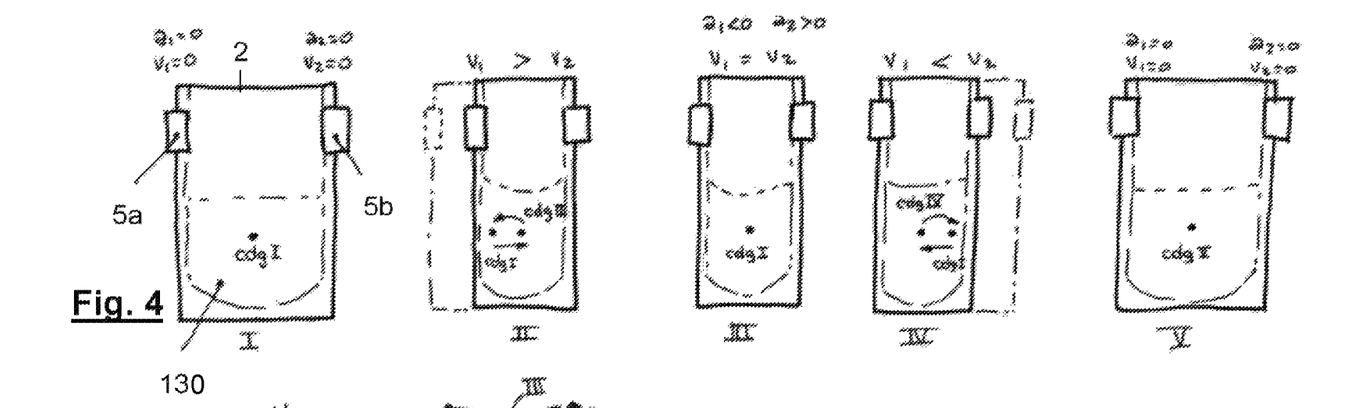
FIGS. 4 to 6 are respective representations of a sequence in the transportation of a container between two consecutive stops. The graph illustrates the velocity and acceleration model applied to both the tractor and push arms on an individual basis and there is a schematic representation of the general shape adopted by the container as it is transported, all according to a method that may be applied to a device in accordance with the invention.

FIG. 4 also shows a sequence in the transportation of a flexible container 2 held suspended between a tractor arm 5b and a push arm 5a between two stop stations, coinciding for example with work stations of a packaging module or packaging machine. In the embodiment of the transportation manoeuvre represented in FIG. 5, the tractor 5b and push 5a arms are jointly driven but this time, according to different velocity and acceleration models. Despite the fact that the content 130 of the container 2 is equally subject to the forces of inertia generated by the start-up and stop maneuvers in the movement of said tractor and push arms, 5b and 5a respectively, the same are compensated by the relative movement between the walls of the container 2.

As shown in the sequence represented in FIG. 4, starting from the static position illustrated the first window, in which the centre of gravity, indicated by cdg I, is arranged in the centre of the container 2, in an acceleration stage, both the tractor arm 5b, at a velocity v2 and the push arm 5a, at a velocity of v1, move simultaneously in a forwards moving direction, thus fulfilling the mathematical relation V1>V2, which gives rise to both arms coming closer together, as shown in the second window of FIG. 4. In practice, the forwards movement of the push arm 5a tends to move the content 130 of the container in the opposite direction to that which said content tends to follow as a result of the force of inertia, as indicated by the arrows in the second window, linked to the momentary centre of gravity of the container 2.

Figure 5:
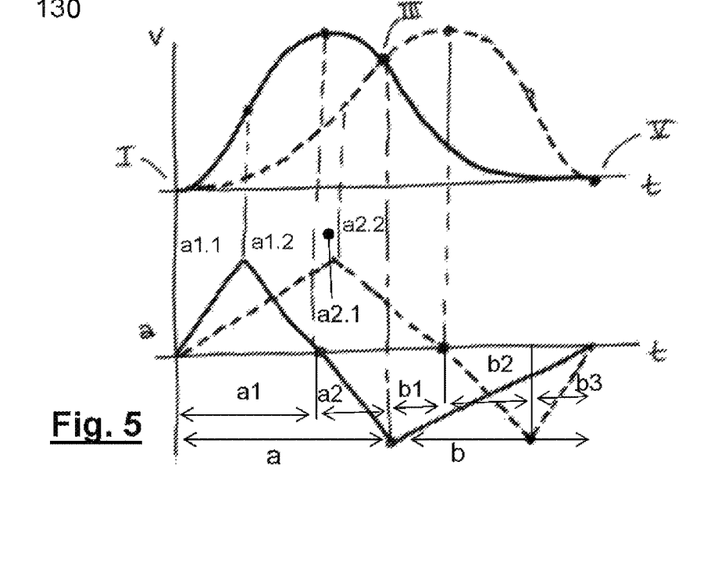

As shown in FIG. 5, which provides a continuous representation of the evolution of the velocity (v) and acceleration (a) of the push arm 5a and a discontinuous representation of the evolution of the same variables for the tractor arm 5b, in this acceleration phase, firstly in a stage a1, the acceleration of both tractor 5b and push 5a arms are positive and subsequently, in a stage a2, only the push arm 5a has positive acceleration, until the velocity of both the tractor 5b and push 5c arms become equal, as shown in the third window of FIG. 4.

Having reached this point, coinciding with the midpoint of the trajectory followed by the container 2, both the tractor arm 5b, at a velocity v2 and the push arm 5a, at a velocity v1, continue moving simultaneously in a forwards moving direction, this time fulfilling the mathematical relation V2>v1, thus having the opposite effect on the content 130 to that produced in the acceleration phase. In other words, the forwards movement of the tractor arm 5a tends to redistribute the content 130 of the container, in such a way that the centre of gravity thereof moves in the opposite direction to that which it would tend to travel upon the contents thereof crashing against one side of the container 2 as a result of the force of inertia, as indicated by the arrows in the fourth window, linked to the centre of gravity of the container 2 at that moment.

As shown in FIG. 5, in this deceleration phase, in a first stage b1, the acceleration value of the push arm 5a is negative and the absolute value thereof decreases, whilst the acceleration value of the tractor arm 5b decreases. In an intermediate stage b2, the acceleration value of the push arm 5a continues to be negative and the absolute value thereof decreases, whilst the acceleration value of the tractor arm 5b is negative and the absolute value thereof increases. In a third stage b3, the acceleration value of both the tractor 5b and push arms 5a is negative and the absolute values thereof decrease until a value of 0 is attained.

Figure 6:
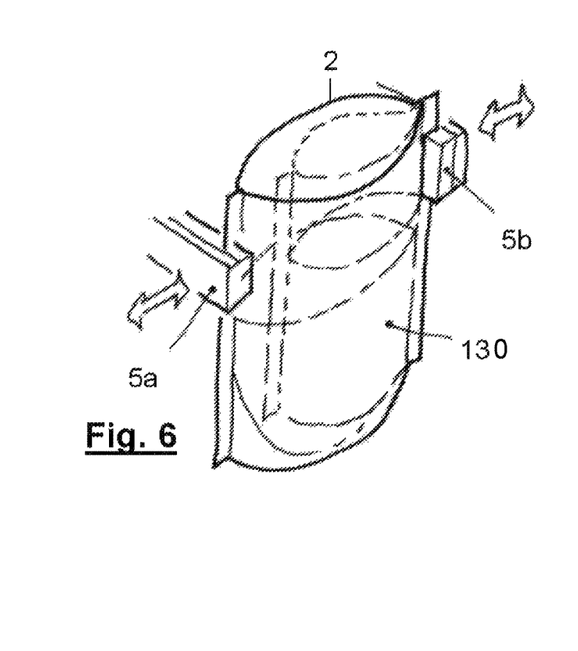

FIG. 6 is a schematic discontinuous representation of the various forms adopted by the container 2 and the content thereof during the transportation manoeuvre.

Figure 7:
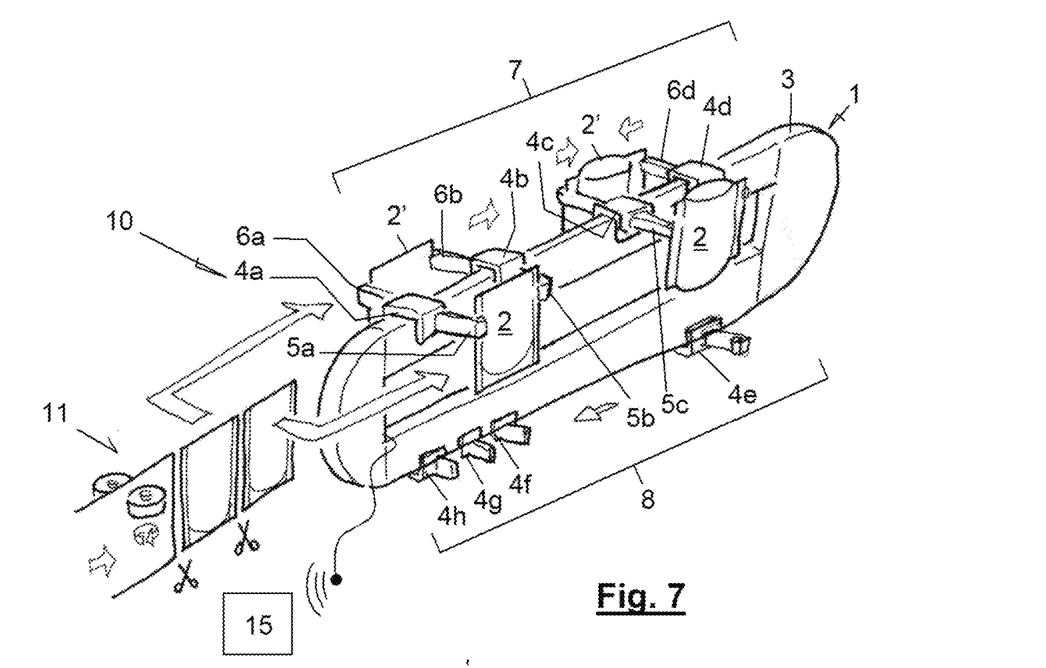
FIG. 7 represents a first embodiment of a device according to the invention.

The machine 10 represented in FIG. 7 shows a device 1, which is particularly capable of putting the method illustrated in FIGS. 4 to 7 into practice.

This transportation device 1 comprises a number of guide means 3 formed by a track, which determines a closed route on a vertical plane (Y) (see FIG. 8), upon which a plurality of carrying elements that can be operated individually slide, in order to be slid along the length of the track. Only eight have been represented in FIG. 7, namely carrying elements 4a to 4h.

Each carrying element has an arm at each side of said vertical plane (Y), which is designed to work alongside that of the other carrying element adjacent to them, in order to jointly secure and transport a corresponding container.

The closed route referred to above comprises a horizontal stretch 7, thus meaning the device 1 is capable of transporting flexible containers 2, open at the top, at least along the length of said horizontal stretch 7.

In the example, the carrying elements 4a and 4b represented on the abovementioned horizontal stretch 7 may be operated individually, in order to be moved along the length of the track. They have a pair of arms 5a, 6a and 5b, 6b, each one of which extends to one side of said vertical plane (Y), each arm 5a; 6a of the carrying element 4a being designed to work alongside the arm 5b; 6b of the other carrying element 4b, arranged on a same side of the vertical plane, in order to jointly secure and transport a corresponding container 2, 2', as shown in FIG. 7.

The number of carrying elements is preferably even.

In the example shown in FIG. 7, the device 1 employs a magnetic field in motion in order to directly drive each carrying element 4a to 4h, thus removing the gear heads, axles, keys, toothed chains and belts often used in traditional rotor engines in order to transport carts carrying securing and transportation tools pertaining to the containers.

Devices that employ magnetic fields to individually drive motor elements designed to carry out the function carried out by the carrying elements 4a to 4h of the device 1 of the invention described herein are described, for example, in patent documents WO 03/105324 and WO 2012/159005. In order to put the invention into practice, commercial XTS (Extended Transport System) solutions provided by the company Beckhoff may be used or iTRACK solutions, from the company Jacobs automation.

Within the invention framework, the device 1 comprises a number of control means 15 capable of governing the movement of said carrying elements 4a to 4h, following a pre-established velocity and acceleration model, specifically that in which pairs of carrying elements are formed, the movement of which would be programmed for putting the invention method into practice. More specifically, these control means 15 comprise programmable means capable of governing the movement of a first and second carrying element, in order to simultaneously move them in a same forwards moving direction on the horizontal stretch 7, applying a velocity v2 to the second carrying element and a velocity v1 to the first carrying element, thus fulfilling the mathematical relation V1>v2 and subsequently, without stopping the movement of the carrying elements applying a velocity v2 to the second carrying element and a velocity v1 to the first carrying element, thus fulfilling the mathematical relation V1<v2, the separation between them being that of the arms thereof at a distance corresponding to the width of a flexible container 2 to be transported.

Said programmable means are preferably capable of governing the movement of each pair of carrying elements according to the velocity and acceleration model set out in FIG. 5, in order to transport two containers 2 and 2' simultaneously, according to the sequence represented in FIG. 4, between two work stations in a packaging machine.

This embodiment furthermore makes it possible to drive the carrying elements 4e to 4h according to different velocity models along the length of the lower horizontal stretch 8 for empty return, relative to the velocity model transmitted to the carrying elements 4a and 4b along the length of their trajectory along the upper horizontal stretch 7. The carrying elements may especially be transported, once the transported containers have been freed, at great velocity along the length of the curved link stretch between the upper horizontal 7 and lower horizontal 8 stretches and along the length of the lower horizontal stretch, in order to enter into waiting state, until they are needed to transport a container once more, as illustrated in FIG. 7. This way of operating makes it possible to save on the number of carrying elements.

Figure 8:
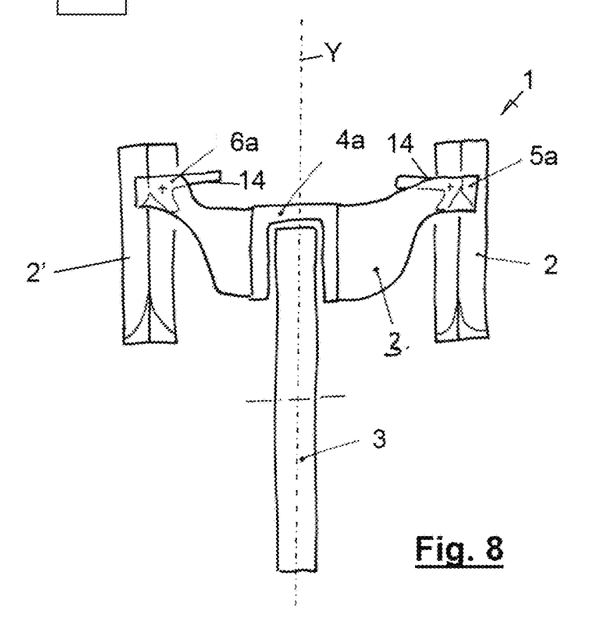
FIG. 8 is a schematic representation of a section, according to a cross section, coinciding with a carrying element, pertaining to the device represented in FIG. 7.

The arms of the carrying elements 4a to 4h have a number of securing means 14, as previously known about, configured in the form of pincers, designed to secure at least one container in a respective anchoring area linked thereto, said securing means 14 being located on the corresponding arms, in such a way that the containers 2, 2' being secured and transported to each side of the vertical plane (Y) are equidistant from the same, as shown in FIG. 8.

Figure 9:
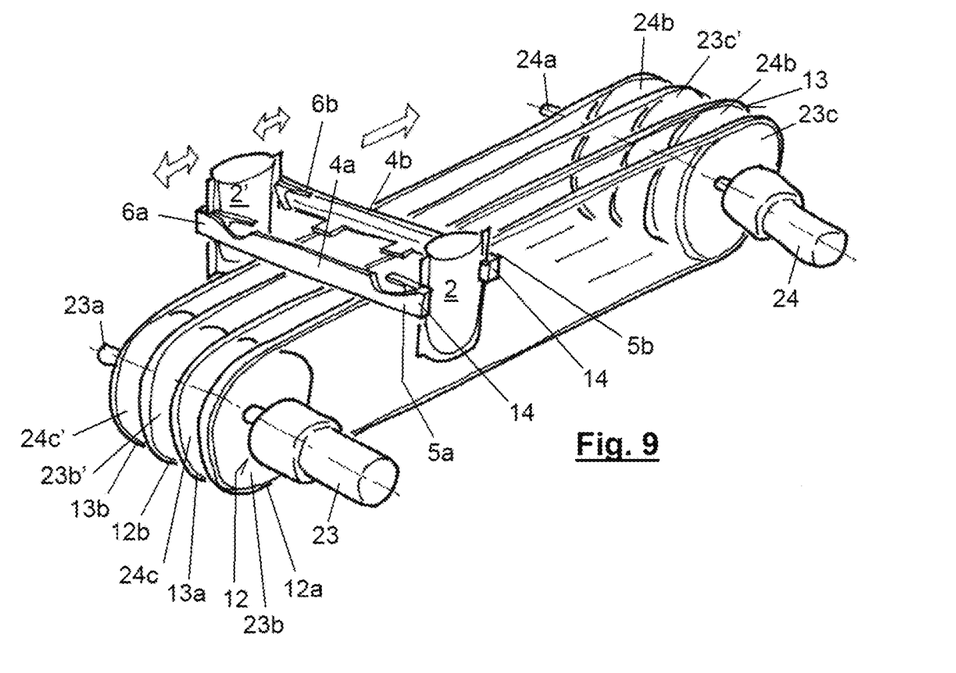
FIG. 9 represents a second embodiment of a device according to the invention.

In the embodiment represented in FIG. 9, the device 1 uses a first and second continuous conveyer system 12, 13, which may be operated individually, each one being linked to a series of carrying elements, the carrying elements of one series being placed amongst the carrying elements of the second series. A number of control means, not shown, coincide with the operation by means of respective motors pertaining to the continuous conveyor systems.

In the example, the carrying elements of the first series, of which only the carrying element 4a is represented in FIG. 9, are linked to the first continuous conveyer system 12, which comprises two belts or chains 12a and 12b and the carrying elements pertaining to the second series, of which only carrying element 4b is represented in FIG. 9, are linked to the second continuous conveyer 13, which comprises two belts or chains 13a and 13b, alternated with the belts or chains 12a and 12b of the first continuous conveyor system.

Just like in the previous embodiment, each carrying element has a pair of arms, intended to work alongside the arms of another adjacent carrying element, in order to transport a container 2.

In this embodiment, all the carrying elements pertaining to a same series shall be driven in unison by a same continuous conveyor system.

The drive means 23 of the first continuous conveyor system 12 shall be controlled by a central unit with programmable means and the operation thereof shall be that which applies the movement model of the push arms 5a, 6a to the carrying elements, whilst the drive means 24 of the second continuous conveyor system 13 shall be controlled in such a way that the operation thereof shall be that which applies the movement model of the tractor arms 5b, 6b to the carrying elements.

In an embodiment not shown, the use of one single drive motor for both continuous conveyors 12, 13 was intended, one of which would be coupled directly to the single motor and the other would be mechanically linked to the same by means of a differential system, which would enable a coordinated movement of both conveyors.

Figure 10:
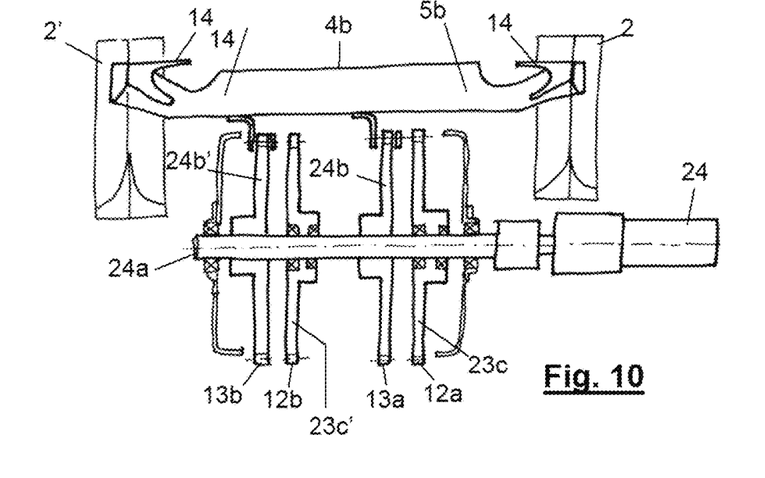
FIG. 10 is a schematic representation of a section, according to a cross section, coinciding with a carrying element, pertaining to the device represented in FIG. 9.

FIG. 10 represents a detail of the support of a carrying element, in this case carrying element 4b, on the two belts or chains 13a, 13b of the same continuous conveyor system 13.

In the example, the drive means 23 and 24 transmit the corresponding forwards movement to each continuous conveyor system 12, 13, by means of transmission axles 23a and 24a and pairs of pulleys or drive wheels 23b, 23b' and 24b, 24b'. The pair of pulleys or divert wheels 24c, 24c' pertaining to the transportation system 13 are freely mounted around the gear shaft 23a of the drive means 23 of the transportation system 12 in such a way that they can rotate freely. Likewise, the pulleys or divert wheels 23c and 23c' of the transport system 12 would be arranged around the drive shaft 24a of the drive means 24 of the transport system 13, in such a way that they can rotate freely.

The invention intends that in a reserve area coinciding for example with the filling station of a machine, without unhooking the carrying elements from their corresponding transport systems, they can move their arms in order to move closer and separate from the arms of an adjacent carrying element.

Moving the arms of the two carrying elements that work together in securing a same container or containers, in the direction in which both come together, gives rise to the opening of said containers in a known way.

Figure 11:
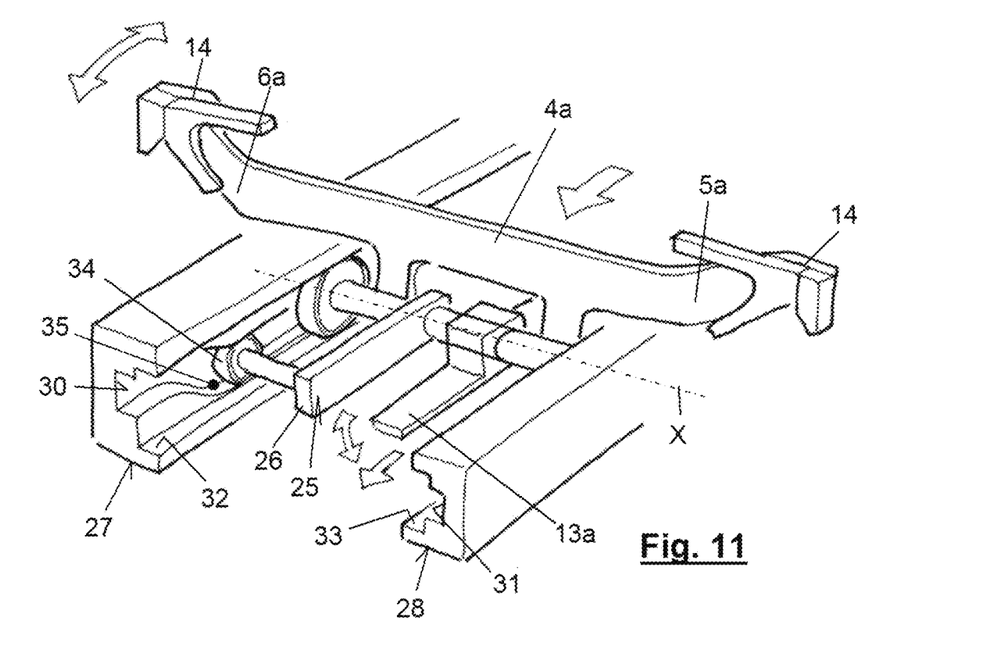
FIG. 11 represents an alternative embodiment of the device represented in FIG. 9, specifically a way of coupling a carrying element to the guide means.

FIG. 11 represents a detail of the coupling of a carrying element 4a to the guide means 3 in an embodiment of the device 1 according to the invention.

In this embodiment, the carrying element 4a is linked to the guide means 3 and is capable of rotating around a perpendicular axle (X) on the vertical plane (Y) not shown. Furthermore, the carrying element 4a has a rotation mechanism 25, which depending on the momentary position of said carrying element 4a along the length of the guide means, would be arranged in a pre-determined angular position. In this example, the arms 5a and 6a are firmly joined to the carrying element 4a and rotate together around the axle (X). The carrying element 4a is joined to the belt 13a that pulls it along the length of the guide means 3.

In FIG. 11, it is possible to observe that the guide means 3 comprise a first and second track 27, 28 which are parallel to one another and onto which the carrying element 4a fits, in such a way that it can slide, which has two wheels 29 mounted to it (only one of which is visible in FIG. 11), which can rotate around said perpendicular axle (X). Each one of the wheels 29 fit in the corresponding opening 32, 33 of one of the tracks 27, 28, in such a way that the carrying element 4a is suspended between these two tracks 27, 28 in such a way that it can slide.

The abovementioned rotation mechanism 25 comprises a lever 26, the instantaneous inclination of which is transmitted to the assembly formed by the carrying element 4a and the arms thereof 5a and 6a, thus obliging them to rotate around the perpendicular axle (X). This lever 26 has a cam follower 35 in the form of a roller in the example, which slides along a cam channel 34 joined to one of the tracks 27 or 28.

In an alternative embodiment, the tracks 27, 28 have both grooves 30, 31, which determine both cam channels 34, each one of which is intended to drive the rotation of a lever 26 pertaining to a carrying element.

According to this variant, the groove 30 of the first track 27 determines the cam channel 34 for the cam followers 35 pertaining to the rotation mechanisms 25 of the first series of carrying elements and the groove 31 of the second track 28 determines the cam channel 34 for the cam followers 35 of the second series of carrying elements. This solution advantageously makes it possible for the carrying elements of the first series, the arms of which carry out the function of tractor arms for example and the carrying elements of the second series, the arms of which carry out the function of push arms, to all be equal but with those pertaining to one series being arranged at 180° to those pertaining to another series, between the tracks 27 and 28 of the guide means 3.

Figure 12:
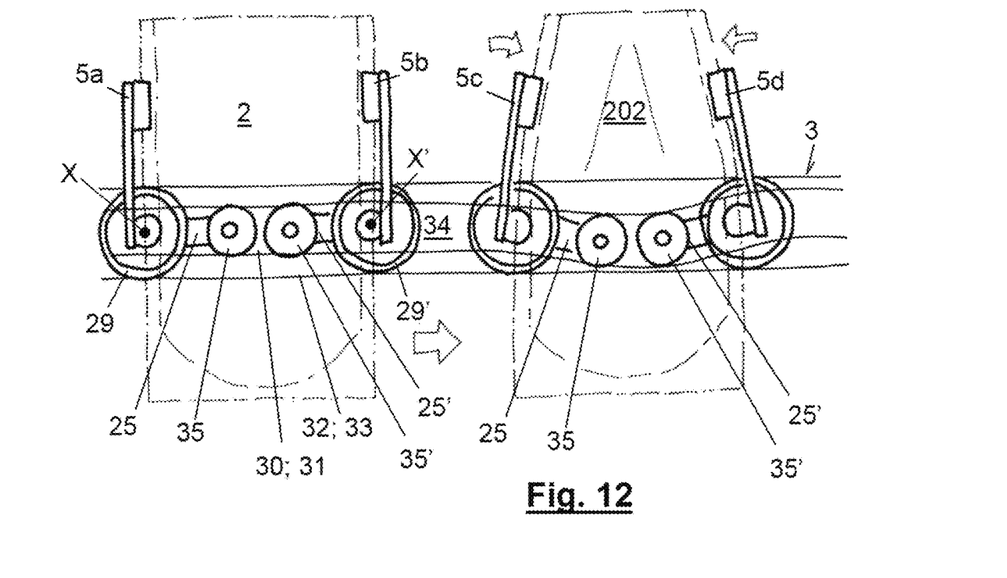
FIG. 12 is a schematic representation of the alternative position the arms linked to various transportation elements may adopt, according to the location of the same on the guide means.

FIG. 12 is a schematic representation of the operation of device 1 represented in FIG. 11.

FIG. 12 illustrates two containers 2, 202, in different positions along the length of the guide means 3 of the device 1, the openings 32, 33 and grooves 30, 31 of the two tracks that form it having being represented overlapping. As can be seen in FIG. 12, the angular position of the arms 5a and 5b for securing the container 2 and the angular position of the arms 5c and 5d for securing the container 202 is different, in each case being determined by the inclination of their respective rotation levers 26 for the push arms 5a and 5c and 26' for the tractor arms 5b and 5d, respectively, imposed by the position of the respective cam followers 35, 35', driven along the cam channels 34, which are formed by the grooves 30 and 31, overlapped in the drawings.

The container 202 is shown in an area coinciding with the filling station for the transported containers. In these stations, the shape of the grooves 30 and 31 arranges the cam followers 35 and 35' in a position such that it gives rise to the rotation of the tractor 5d and push 5c arms in the direction in which they both come closer together, thus giving rise to the opening of the container 202.

Figure 14:
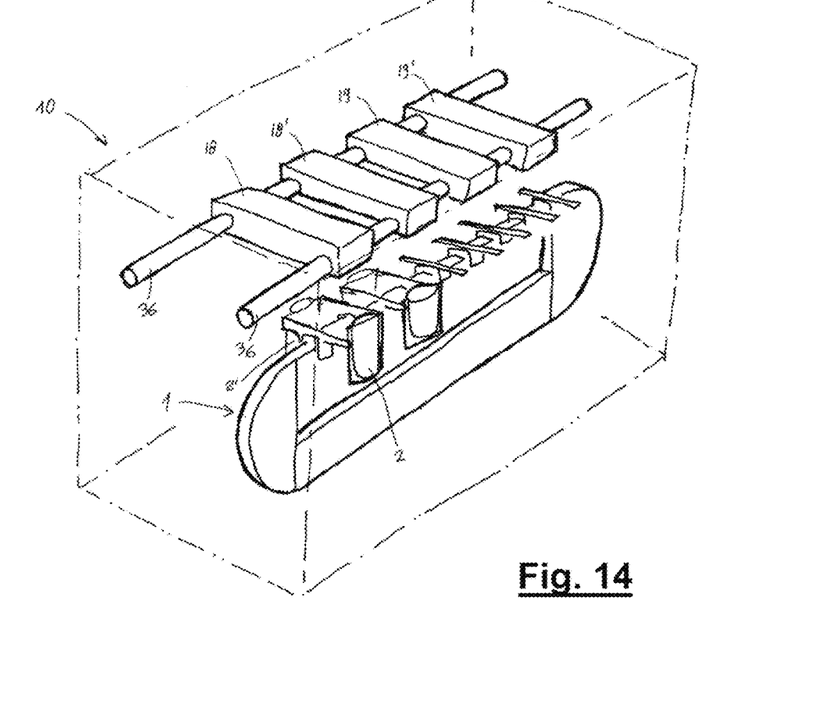
FIGS. 14 and 15 are schematic representations of the position adopted by the work stations relative to the transportation device.

FIG. 14 represents the arrangement of the successive work stations 18, 18', 19 and 19' in a machine 10 with a transportation device 1 for containers 2, 2', according to the invention. Said work stations 18, 18', 19, 19' shall be supported suspended above the transportation device 1. In the example in FIG. 14, the work stations are mounted in such a way that they are capable of sliding on two longitudinal guides 36. This formation enables the suitable fastening of the pieces of equipment that form each work station, in addition to greater flexibility, position changes and greater accessibility to the transportation device 1.

Figure 15:
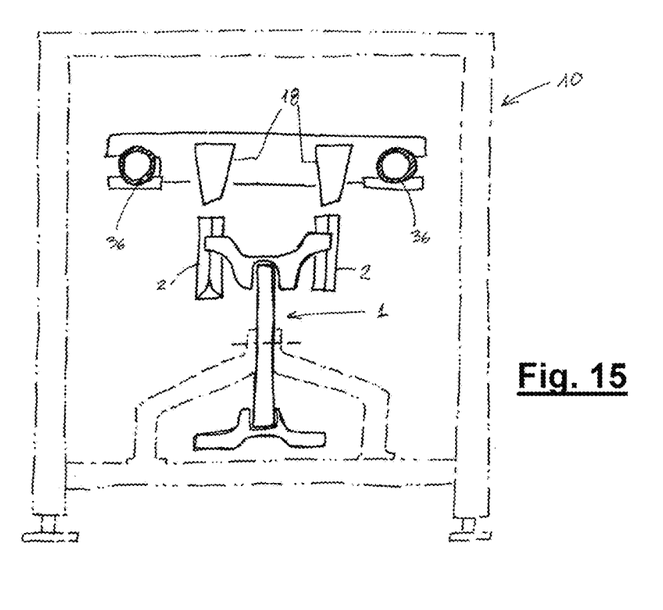
Figure 16:
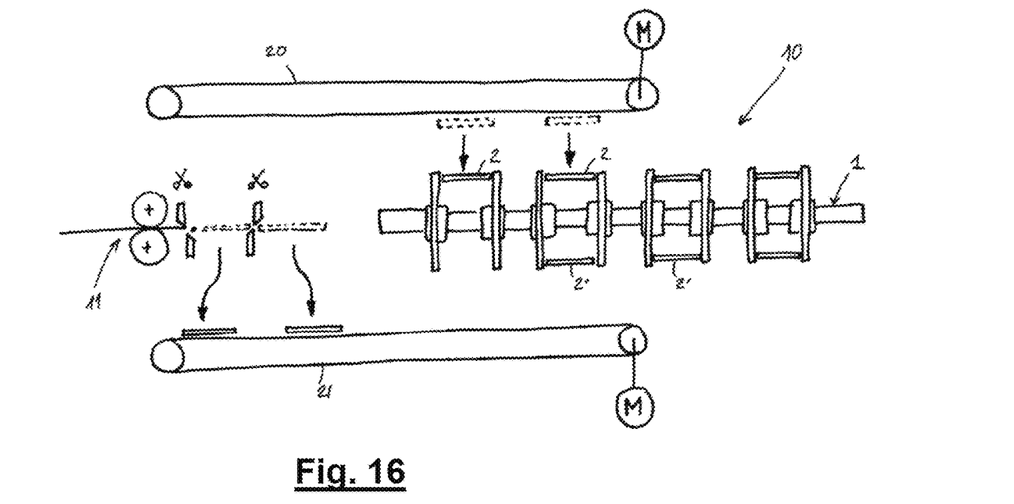
FIGS. 16 to 19 represent a sequence in the transfer of containers, according to an embodiment of the invention, from a production module to a transportation device according to the invention, using a transfer module.
Figure 17:
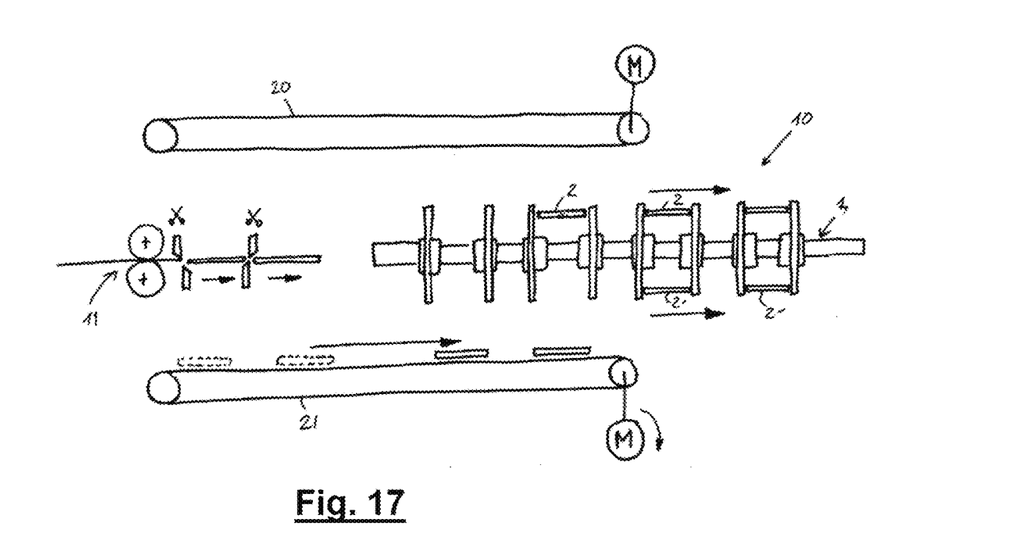
Figure 18:
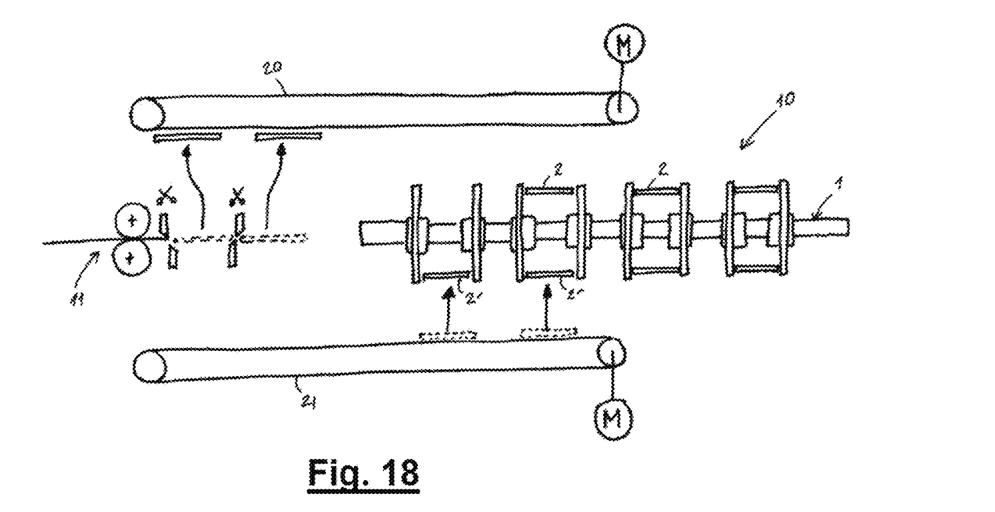
Figure 19:
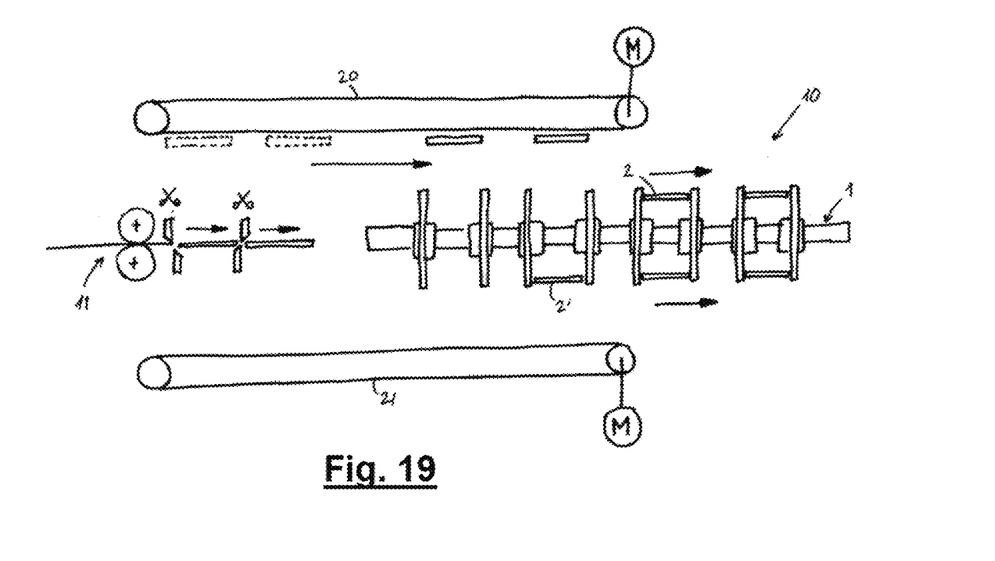

FIG. 15 is a cross section of the machine 10, which makes it possible to observe the relative position between the work stations, only showing the work station 18 and the transportation device 1.

Figure 13:
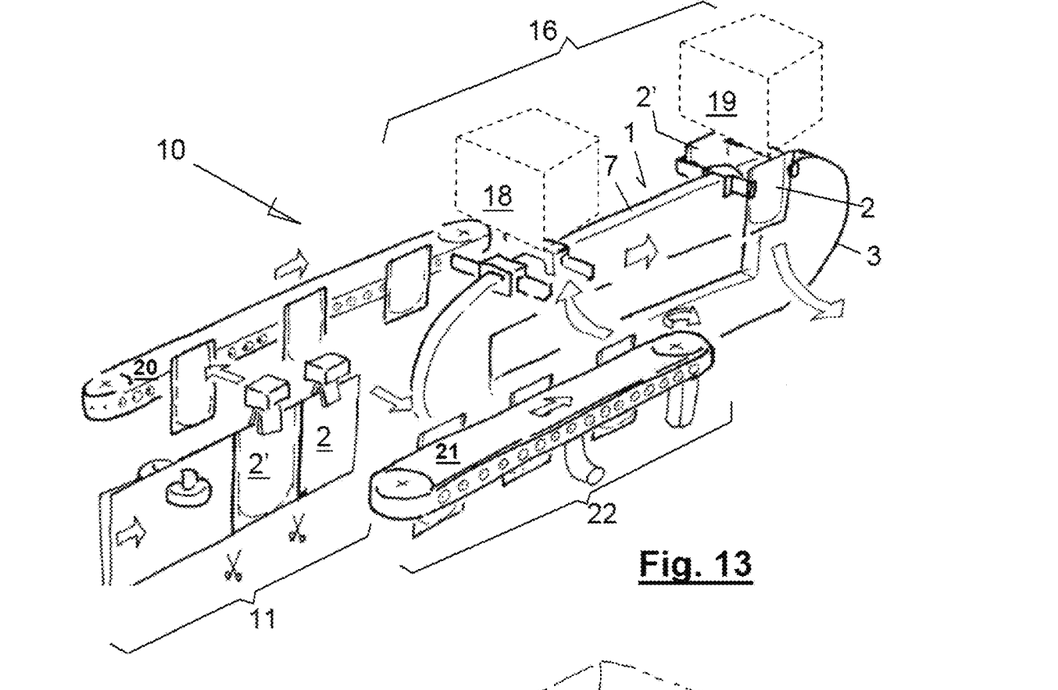
FIG. 13 represents a machine for manufacturing and filling containers, comprising a packaging module with a device according to the embodiment of the invention represented in FIG. 9, as well as a traditional production module and a module for transferring containers from the production module to the packaging module.

FIG. 13 shows a horizontal packaging machine 10, comprising a packaging module 16, a traditional production module 11 and a transfer module 22 for transferring the containers produced from the production module 11 to the packaging module 16.

The packaging module 16 comprises a device 1, such as that represented in FIG. 9, for transporting the containers 2, 2', the guide means 3 of which comprise an upper operational section, with a first horizontal stretch 7 and a lower return section, with a second horizontal stretch 8, overlapping the first horizontal stretch 7. A succession of work stations 18 and 19 are located on the horizontal stretch 7, shown in a schematic representation, which correspond to a filling station and upper closing station for the containers transported between every two carrying elements, of which only the two pairs of carrying elements 4a, 4b and 4c, 4d are shown.

In this example, the production module 11 for producing flexible containers 2 is of the variety that forms a succession of containers of the envelope or small bag variety from a continuous sheet of thermo-welded material folded over itself along the length of longitudinal fold lines, which for example are self-sustainable like those known as doypack, which are separated in a final cutting station, thus producing two containers 2 and 2' in each work cycle.

The transfer module 22 comprises, at each side of the device 1 for transporting the containers 2, 2', both forwards moving continuous intermittent conveyors 20, 21, which extend from the cutting station of the production module 11 to the start of the upper operational section of the track pertaining to the device 1 for transporting containers, the continuous conveyors 20, 21 being equipped with means for transporting produced containers 2, 2', which will be presented and transferred to the arms of the corresponding side of the device 1, to be transported to the packaging module 16.

In FIGS. 16 to 19, a sequence showing the transfer of containers 2, 2' from the continuous conveyors 20 and 21 to the transportation device 1 is shown.

The containers produced in the subsequent forwards moving cycles of the production module 11 are alternately loaded on the continuous conveyors 20 and 21. In the example, the two containers obtained in each cycle are simultaneously transferred by means of a number of first securing means 37a from a transfer mechanism 37 to one of the continuous conveyors 20 or 21, whilst a number of second securing means 37b pertaining to the transfer mechanism 37 are prepared to receive the containers produced in the next forwards moving cycle in the production module 11, from the production module 11, specifically from the cutting station. This arrangement makes it possible to operate the transfer mechanisms at a lesser rhythm, with more gradual movements.

Figure 20:
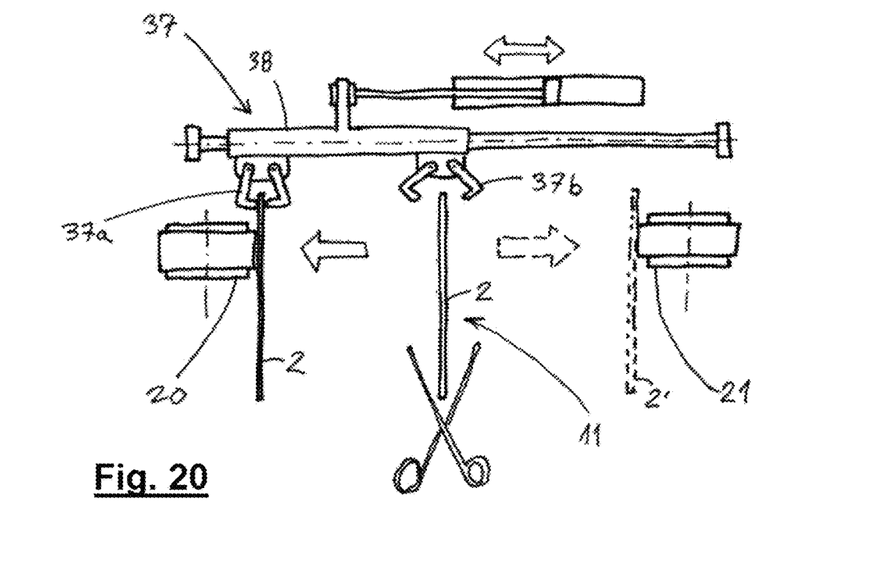
FIG. 20 is a schematic representation of a transfer module according to a cross section.

FIG. 20 represents an embodiment of this transfer mechanism 37, which comprises a group or cart 38, which carries the securing means 37a and 37b, in the form of pincers and is mounted in such a way that it is capable of carrying out a swinging movement between two positions, one in which the securing means 37a would be arranged in a transfer position for transferring containers to the continuous conveyor 20 and the securing means 37b in a securing position for securing the containers delivered by the production module 11 and others in a position in which the securing means 37b would be arranged in a transfer position for transferring containers to the continuous conveyor 21 and the securing means 37a in a securing position for securing the containers delivered by the production module 11.

Likewise, the invention intends that the transfer of containers 2, 2' from each one of the continuous conveyors 20 and 21 be carried out to the transportation device 1.

Figure 21:
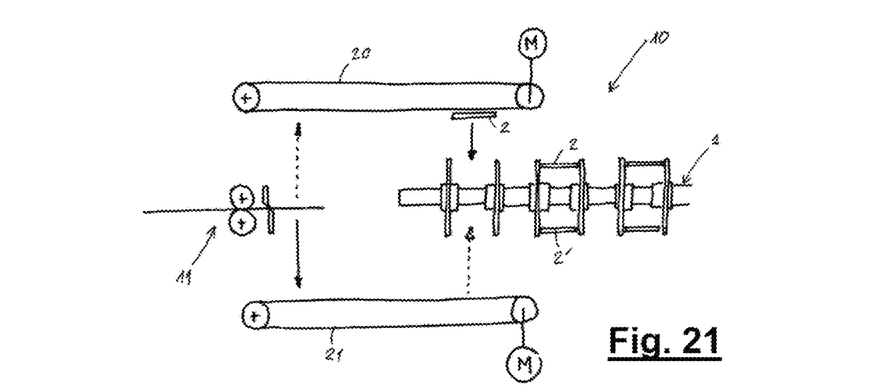
FIGS. 21 and 22 illustrate alternative forms of proceeding to place containers originally lined up in a container production module in a suitable arrangement to be transferred to a transportation device pertaining to a packaging module.
Figure 22:
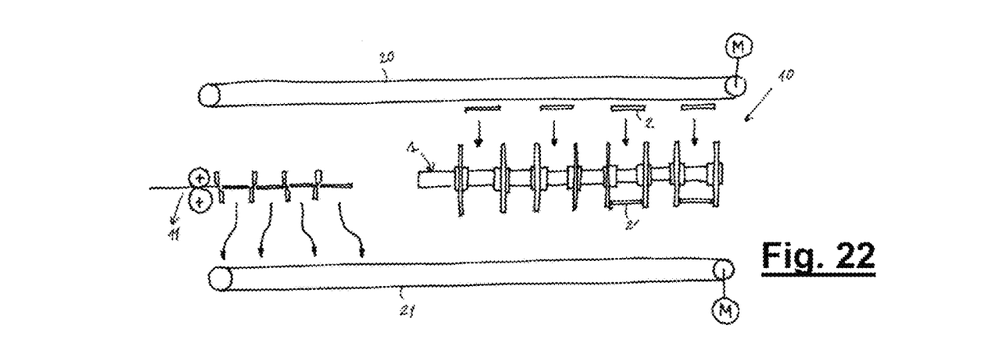

FIGS. 21 and 22 are schematic representations of two alternatives to the example shown in FIG. 13. In the first case, a machine 10 is shown, the production module 11 of which delivers a container in each work cycle. In this case, the container obtained is always transferred to the conveyor to which it was not transferred in the previous cycle, it being possible for both conveyors 20, 21 to travel a same distance forwards in each push on the forwards trajectory, where the forwards movement is produced every two working cycles of the production module 11. In the second case, a machine 10 is shown, which delivers four containers in each work cycle. Transferring the containers 2, 2' alternately to the continuous conveyors 20, 21, following the same forwards movement as in the example shown in FIG. 16, in two forwards movements, the containers 2, 2' would both be face to face with one another two by two, ready to be transferred to the pairs of carrying elements.

The invention claimed is:

1. A device for transporting flexible containers on a packaging line, comprising:
   a guide, which determines a closed route in a vertical plane, the guide comprising an upper horizontal stretch and a lower horizontal stretch below the upper horizontal stretch, and wherein both the upper horizontal stretch and the lower horizontal stretch are located in the vertical plane;
   a first and a second carrying element forming a pair that slide on the guide, wherein each carrying element has two arms, each one of which extends to one side of said vertical plane, each arm of the first carrying element configured to operatively work with a corresponding one of the arms arranged on a same side of the vertical plane of the second carrying element to jointly secure and transport a respective container, wherein two of the containers are secured between the first and second carrying elements and transported along a length of the upper horizontal stretch of said route at the same time with each container positioned on a side of the vertical plane opposite the other container; and
   wherein the first and second carrying elements are individually controlled to move along the guide by magnetic field effect generated in a sphere of influence of each carrying element.

2. The device according to claim 1, wherein the arms have securing means for holding the containers in a respective anchoring area linked thereto, said securing means located on the arms to secure and transport the containers along positions on each side of and equidistant to the vertical plane.

3. The device according to claim 1, comprising additional pairs of carrying elements, individually operable to move along the guide by magnetic field effect generated in the sphere of influence of each carrying element.

4. The device according to claim 3, comprising a number of control means for governing the movement of said carrying elements individually according to a pre-established velocity and acceleration model.

5. The device according to claim 4, wherein the control means comprise programmable means for governing intermittent movement of said first and second carrying elements for each pair of carrying elements to simultaneously move said first and second carrying elements between every two consecutive stops in a same forwards moving direction on the upper horizontal stretch, applying a velocity v2 to the second carrying element, which is furthest forwards in the forwards moving direction and a velocity v1 to the first carrying element, which is furthest back in the forwards moving direction, thereby fulfilling the mathematical relation $V1>v2$ and subsequently without stopping the movement of the carrying elements, applying a velocity v2 to the second carrying element and a velocity v1 to the first carrying element, thus fulfilling the mathematical relation $V1<v2$.

6. The device according to claim 1, comprising a first and second continuous conveyor system, operable individually or together, a corresponding first and second series of the carrying elements, the carrying elements of the first series linked to the first continuous conveyor and the carrying elements of the second series linked to the second continuous conveyor, the carrying elements of the first series placed amongst the carrying elements of the second series, respective securing means for holding the containers on the arms located opposite two adjacent ones of the carrying elements that form a pair.

7. The device according to claim 6, comprising a number of control means for governing operation of said continuous conveyor systems individually or together, according to a pre-established velocity and acceleration model.

8. The device according to claim 7, wherein the control means govern intermittent operation of said first and second continuous conveyors to simultaneously move between every two consecutive stops in a same forwards moving direction, transferring a velocity v2 to one of first and second continuous conveyors and a velocity v1 to the other, thus fulfilling the mathematical relation $V1>v2$ and subsequently without stopping the movement of the carrying elements, applying a velocity v2 to the second carrying element and a velocity v1 to the first carrying element, thus fulfilling the mathematical relation $V1<v2$.

9. The device according to claim 8, wherein the arms of each carrying element are linked to the guides and rotate around a perpendicular axle in a direction of the vertical plane, each carrying element having a rotation mechanism that depending on the momentary position of the carrying element on the guides, has the arms of the carrying element in a pre-determined angular position, thereby moving the arms closer to or further away from an adjacent carrying element, and thereby moving the walls of the container secured by the arms closer together to open the container.

10. The device according to claim 9, wherein the rotation mechanism of each carrying element comprises a lever, the momentary inclination of which is transmitted to the arms to jointly rotate around the perpendicular axle, the lever having a cam follower that slides along a cam channel formed in or joined to the guides.

11. The device according to claim 10, wherein the guides comprise a first and second parallel track, between which the carrying elements fit and slide, each carrying element has two wheels mounted, which can rotate around the perpendicular axle, each carrying element fits on a corresponding track, the bottom of each track having a groove, at least one of which serves as a cam channel that controls the rotation of the lever of the rotation mechanism of the carrying element.

12. The device according to claim 11, wherein the groove of the first track determines the cam channel for the cam followers of the first series of carrying elements, while the groove of the second track determines the cam channel for the cam followers of the second series of carrying elements.

13. A horizontal packaging machine, comprising a device for transporting containers according to claim 1, and a succession of work stations, which comprise at least a filling station and an upper closing station for the containers transported between every two arms of the device and that simultaneously handle and operate on two containers secured opposite one another with one at each side of the guides by corresponding carrying elements, while the same are on the horizontal stretch of the upper operational section of said guides.

14. The horizontal packaging machine according to claim 13, comprising a production module for producing flexible containers from a continuous sheet of thermo-welded material, folded over itself along the length of longitudinal fold lines, with a final cutting or separation station for the containers obtained and a transfer module for transferring containers from the container production module to the device for transporting containers, comprising, at each side of the device for transporting containers, both forwards moving continuous intermittent conveyors, which extend from the cutting station of the production module to the start of the upper operational section of the guides of the device for transporting containers, the continuous conveyors having means for transporting produced containers, to be presented and transferred to the arms of the carrying elements of the corresponding side of the device for transporting containers, in order to be transferred to the same.

15. The horizontal packaging machine according to claim 13, wherein the work stations are held suspended above the transportation device.

16. The packaging machine according to claim 15, wherein the work stations are mounted to slide on two longitudinal guides, located above the transportation device.

17. A device for transporting flexible containers on a packaging line, comprising:
  a guide defining a closed path in a vertical plane, the guide comprising an upper horizontal stretch and a lower horizontal stretch below the upper horizontal stretch, the upper horizontal stretch and the lower horizontal stretch located in the vertical plane;
  a first carrying element movably supported on the guide and comprising a pair of arms, one of the pair of arms extending to one side of the vertical plane and the other of the pair of arms extending to an opposite side of the vertical plane;
  a second carrying element movably supported on the guide and comprising a pair of arms, one of the pair of arms extending to one side of the vertical plane and the other of the pair of arms extending to an opposite side of the vertical plane;
  the first carrying element and the second carrying element operatively controlled as a pair to support and convey two containers along the guide, each container secured on one side of the vertical plane by respective arms of the first and second carrying elements that extend to the same side of the vertical plane; and
  wherein the first and second carrying elements are individually controlled to move along the guide by a magnetic field generated.

* * * * *